June 27, 1944.  J. R. ALMOND  2,352,357
PNEUMATICALLY ASSISTED HYDRAULIC BRAKE SYSTEM
Filed Nov. 12, 1941
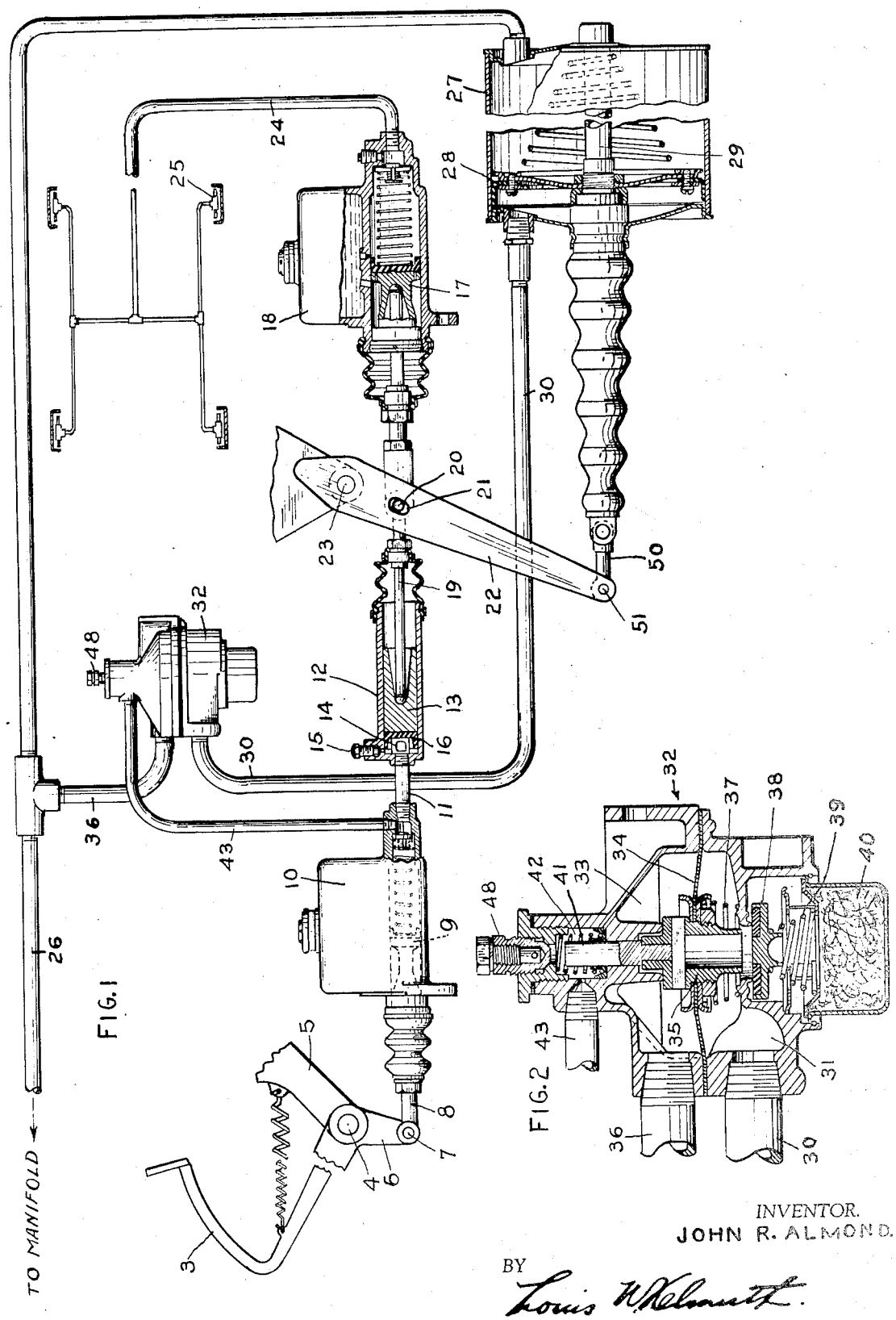
INVENTOR.
JOHN R. ALMOND.
BY
*Louis W. Kelmuth*

Patented June 27, 1944

2,352,357

UNITED STATES PATENT OFFICE 2,352,357

PNEUMATICALLY ASSISTED HYDRAULIC BRAKE SYSTEM

John R. Almond, Cleveland, Ohio, assignor to The Midland Steel Products Company, Cleveland, Ohio, a corporation of Ohio Application November 12, 1941, Serial No. 418,687

3 Claims. (Cl. 60—54.5)

This invention relates to new and useful improvements in brake systems of the power operated type designed for the actuation of heavy vehicles such as heavy armored army trucks.

An important object of the invention is to provide an effective system which can be readily installed around chassis obstructions which would normally preclude the installation of systems including constructions heretofore known.

Usually, power assisted or operated hydraulic brake systems of this general type have proposed the use of bulky combined pneumatic-hydraulic units which are too large to fit into many designs of chassis, adjacent the foot operated pedal or the brake mechanism. The present invention separates the pneumatic mechanism from the hydraulic master unit in order that the usual relatively small master cylinder can be installed adjacent the pedal and appropriately piped to the pneumatic power actuator which can be conveniently located at any convenient point on the chassis, due to the adaptability of piping to any chassis setup or construction. A separate secondary master cylinder is piped to the primary master cylinder and can therefore also be conveniently located in the chassis adjacent the brakes. A hydraulically operated slave cylinder is employed between the two master cylinders and has a mechanical thrust connection between the piston of the slave cylinder and the piston of the secondary master cylinder in order that a multiplying lever connection can be made between the pneumatically operated power actuator and the secondary master cylinder whereby the latter may be operated by power or may be conjointly or singly operated by manual effort applied to the foot pedal in case the power operated unit fails for any reason. Thus, it will be apparent that the pressure of one master cylinder is added to the pressure of the other to operate in the same direction and that these pressures are not opposed by the pneumatic means but are assisted thereby.

Other objects and advantages of the invention will become apparent during the course of the following description.

In the accompanying drawing forming a part of the application and wherein like numerals are employed to designate like parts throughout the several views, Fig. 1 is a diagrammatic view of the system with the parts thereof broken away to more clearly illustrate the internal construction.

Fig. 2 is an enlarged vertical section of the hydraulically actuated valve for controlling pneumatic pressure to the pneumatic actuator.

Referring now more particularly to the drawing for details, the numeral 3 designates the usual brake pedal of a motor vehicle fulcrumed as at 4 to a part of the chassis 5. This pedal is provided with an angular extension 6 pivotally connected as at 7 to the forward end of a piston rod 8 operating a piston 9 in the usual type of compensating hydraulic master cylinder 10, herein called the primary master cylinder in view of the employment of more than one master cylinder. This primary master cylinder is of the usual construction at present employed for operating hydraulic brakes of the usual motor vehicle and the bore for the piston is of the usual ⅞ inch diameter. It is provided with the usual reservoir and compensation ports.

The pressure end of the master cylinder is connected by a pipe 11 to the forward end of the slave cylinder 12 having a piston 13 reciprocable therein and of a size comparable with that of the primary master cylinder. The forward end of the piston or cylinder has a stop 14 for limiting retractile movement of the piston and the usual bleeder and filler connection 15 is provided at this forward end of the slave cylinder. The piston 13 is of course provided with the usual rubber sealing cup 16 to prevent leakage of fluid pressure past the piston. This piston 13 is operably connected with a piston 17 of a secondary compensating master cylinder 18 by a piston rod 19 having opposite ends operating in the usual conical seats of the two pistons. This common piston rod 19 forms a direct thrust element to transmit movement from the primary master and slave cylinder pistons to the secondary master cylinder piston 17 whenever pressure is exerted upon the foot pedal 3. The piston rod 19 is provided with laterally projecting pins 20 operating in the slots 21 of a power lever 22 fulcrumed as at 23 to the chassis of the vehicle. It will be understood that this lever can be mounted upon either a horizontal or vertical fulcrum 23 whichever is conveniently presented by the chassis structure. The forward end of the secondary master cylinder is connected by a pipe 24 to suitable conduits leading to the usual wheel cylinders 25 associated, one with each vehicle wheel. Thus, upon depression of the foot pedal 3, the piston of the primary master cylinder exerts pressure upon the column of liquid to exercise the same against the face of the slave cylinder piston 13. This in turn moves the thrust rod 19 to force the piston 17 of the secondary master cylinder forwardly within its cylinder to exert pressure on the column of liquid in the pipe 24 leading to the hydraulic wheel cylinders 25 to apply the brakes in the degree determined by the travel of the foot pedal. The diameter of the piston 17 of the secondary master cylinder is 1¾ inches, or about twice the size of the piston of the primary master cylinder. This cylinder is also provided with an individual reservoir.

In order to assist the operation of the hydraulic brakes with pneumatic power, a pipe line 26 extends from the intake manifold of an internal combustion engine to the rear end of a vacuum suspended power actuating cylinder 27. Within this cylinder and normally arranged at its forward end as illustrated, is a spring returned piston 28 having a telescopic piston guide mounted in one end of the power cylinder 27 and telescoping within a piston rod 50. To the forward end of this cylinder is connected a pipe 30 which leads to a brake chamber 31 in a control valve designated in its entirety by the numeral 32. This brake chamber 31 is separated from an upper section chamber 33 by a flexible diaphragm 34 secured to a hydraulically operated valve 35 which is tubular and open at opposite ends so that normally a vacuum condition may exist upon opposite sides of a diaphragm 34. This upper vacuum chamber 33 is connected by a pipe 36 to the manifold vacuum pipe 26 as shown in Fig. 1. The vacuum pressure on opposite sides of the diaphragm 34 is normally overbalanced by a spring 37 to bias the valve 35 off of its seat, which in this instance is a spring pressed air valve 38 normally held upon its seat by a spring 39 which normally cuts off atmospheric air pressure through an air filter 40 to the brake chamber 31. In order to unseat the air valve 38, the valve 35 is provided with a piston 41 which extends into a hydraulic chamber 42 connected by a pipe 43 with the forward end of the primary master cylinder 10 as shown in Fig. 1. A combined filler and bleeder plug 43 is associated with the upper end of the hydraulic chamber 42.

Thus, when hydraulic pressure of sufficient force is exerted through the pipe 43 and in chamber 42, the hydraulic piston 41 of the control valve is moved downwardly of the figure to cause the valve 35 to seat upon the air valve 38, closing off vacuum connections to subsequently push the latter off its seat so that atmospheric air enters through the valve seat into chamber 31 and thence through the pipe 30 to the forward end of the actuator cylinder 27 to move the piston 28 therein to the right of the figure so that its piston rod 50 connected to the lower end of the power lever 22 as at 51 moves the power lever 22 to the right of the figure to correspondingly move the piston 17 of the secondary master cylinder and thereby exert pressure on the column of liquid to the hydraulically operated brakes. When pressure is relieved from the foot pedal, the springs in the various units return the piston to normal position to release the brakes and return the foot pedal to its normal brake release position. These springs as well as those in the control valve can be tensioned so that either the control valve 32 is operated first to apply the hydraulic brakes with a follow-up action of the pedal as manual reserve, or by the operation of the pedal, manual force only may be relied upon to operate the secondary master piston 17 to apply the hydraulic brakes to a certain extent before the control valve 32 comes into operation to augment this initial brake action, with a follow-up power application of the hydraulic brake through the power lever 22. The ratio of this lever is illustrated as approximately 5 to 1, and, of course, may be varied to conform to any conditions.

When the pressure on the foot pedal 3 is relieved, pressure in the control valve chamber 42 lowers to permit the air valve 38 to close and the valve 35 to leave its seat so that manifold pressure is restored in the brake chamber 31 to exhaust the forward end of the power actuator 27 of air and to restore a partial vacuum therein to balance with the degree of vacuum always existing upon the opposite side of the piston 28. Since the control valve is connected by piping, flexible or otherwise, with the manifold pipe 26 and primary master cylinder, it can be located anywhere on the chassis found convenient. By the same token, the slave cylinder 12 and the secondary master cylinder 18 may likewise be so situated and closely adjacent the brakes. Thus, the power units of the system can be located remote from the foot pedal so that the usual size primary master cylinder 10 can be located in close proximity to the pedal regardless of chassis construction.

It will be understood that various changes in the form, size, and relation of parts may be resorted to without departing from the spirit of the invention or the scope of the appended claims.

I claim:

1. A system of hydraulic brakes operated by a pedal, comprising a secondary master cylinder and piston located adjacent the brakes, a primary master cylinder and piston located adjacent the pedal and connected thereto, a slave cylinder having a piston of a size comparable with that of said primary cylinder located between said master cylinders, a transmission member connecting the pistons of said slave and secondary master cylinders, a multiplication lever located entirely exteriorly of any enclosure means and pivotally connected intermediate its ends with said transmission member, an air operated piston connected with the free end of said lever, and a valve operated by the pressure developed in said primary master cylinder to operate said air operated piston and the secondary master cylinder piston with power.

2. A system of pneumatically assisted hydraulic brakes operated by a pedal, comprising primary and secondary master cylinders and pistons connected respectively with the pedal and brakes, a slave cylinder hydraulically connected with said primary master cylinder and having a piston, a piston rod constituting a thrust connection between the pistons of the slave cylinder and secondary master cylinder whereby the former operates the latter to apply the brakes by manual exertion, a fulcrumed lever having a pin and slot connection intermediate its ends with said thrust member, a pneumatically operated piston connected with said lever, and a control valve connected with the primary master cylinder to be actuated by pressure developed therein to control the operation of said pneumatically operated piston.

3. The combination of a primary master cylinder and piston, a secondary master cylinder and piston, a slave cylinder and piston located between said master cylinders, a piston rod constituting a thrust connection between the pistons of the slave and secondary master cylinders whereby the former operates the latter to apply pressure to the brakes by manual force, a lever fulcrumed at one end, a power operated piston connected to the other end of said lever, said thrust connection being connected to said lever at an intermediate point thereon, and a control valve operated by pressure developed in the primary master cylinder to control the operation of said power piston.

JOHN R. ALMOND.